(12) United States Patent
Konno et al.

(10) Patent No.: US 6,598,778 B2
(45) Date of Patent: Jul. 29, 2003

(54) ALUMINUM-BASED METAL LINK FOR VEHICLES AND A METHOD FOR PRODUCING SAME

(75) Inventors: Yoshihiro Konno, Tokyo (JP); Hideyori Sakuragi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/810,554

(22) Filed: Mar. 19, 2001

(65) Prior Publication Data

US 2001/0030222 A1 Oct. 18, 2001

(30) Foreign Application Priority Data

Apr. 13, 2000 (JP) ........................................ 2000-112574

(51) Int. Cl.[7] .............................................. B23K 20/12
(52) U.S. Cl. .................................. 228/112.1; 403/270
(58) Field of Search ........................ 228/112.1, 2.1; 403/300, 270

(56) References Cited

U.S. PATENT DOCUMENTS

| | | | |
|---|---|---|---|
| 6,050,474 A | 4/2000 | Aota et al. | 228/112.1 |
| 6,053,391 A | 4/2000 | Heideman et al. | 228/2.1 |
| 6,244,496 B1 * | 6/2001 | Kato et al. | 228/112.1 |
| 6,298,962 B1 * | 10/2001 | Kato et al. | 188/371 |
| 6,325,567 B1 * | 12/2001 | Kato et al. | 403/270 |

FOREIGN PATENT DOCUMENTS

EP     1 046 453 A2 * 10/2000  ........... B23K/20/12

* cited by examiner

Primary Examiner—M. Alexandra Elve
Assistant Examiner—Kevin P. Kerns
(74) Attorney, Agent, or Firm—Foley & Lardner

(57) ABSTRACT

An aluminum-based metal link including a shaft portion extending along a first axis, a bushing mount portion having a second axis perpendicular to the first axis, and a weld joint portion in which one of the opposed axial end portions of the shaft portion and the bushing mount portion are welded together by friction stir welding (FSW). The weld joint portion has a hole that has a third axis angularly offset from the second axis about the first axis and is formed upon termination of the FSW.

12 Claims, 4 Drawing Sheets

ALUMINUM-BASED METAL LINK FOR VEHICLES AND A METHOD FOR PRODUCING SAME

BACKGROUND OF THE INVENTION

This invention relates to an aluminum-based metal link including a shaft portion and a bushing mount portion connected with an end portion of the shaft portion, for example, an aluminum-based metal link useable as a suspension link of vehicles.

Friction Stir Welding (FSW) is known as one of connection techniques for joining two members made of aluminum-based metal, together. The FSW is accomplished by rotating a friction stir welding tool while contacting with a joint or junction of the two members. The two members are heated at the joint by friction contact with the rotating friction stir welding tool so that base materials of the two members are plasticized and stirred to form a weld joint at which the two members are welded together. The FSW can join the two members at a relatively low temperature as compared with a temperature at which other related techniques such as metal electrode inert gas (MIG) welding are conducted. Therefore, upon producing an aluminum-based metal link having a shaft portion and a bushing mount portion joined to an end portion of the shaft portion, if the bushing mount portion is connected with the end portion of the shaft portion using the FSW, the connection can be sufficiently accomplished without giving adverse influence on nearby components because of the low temperature of the FSW. For instance, a rubber bushing directly attached to the bushing mount portion by vulcanizing adhesion can be prevented from suffering from undesired thermal influences such as reduction of adherence strength, at the FSW process.

FIG. 5 illustrates an aluminum-based metal link having bushing mount portion 2 connected with shaft portion 1 by the FSW. As illustrated in FIG. 5, shaft portion 1 is formed into a hollow cylindrical shape. Bushing mount portion 2 has a small-diameter end portion. First, bushing mount portion 2 is abutted on an end portion of shaft portion 1 by inserting the small-diameter end portion into the end portion of shaft portion 1. In this butt joint state, the outer circumferential surfaces of the end portion of shaft portion 1 and the small-diameter end portion of bushing mount portion 2 are flush with each other. FIG. 6 shows friction stir welding (FSW) tool 5 for the FSW. Friction stir welding tool 5 has base portion 7 and a cylindrical rod 9 connected with base portion 7. FSW tool 5 is rotated and brought into contact with the outer circumferential surfaces of the end portions of shaft portion 1 and bushing mount portion 2 which extend near along the butt joint portion or junction. In this condition, friction heating is produced, which plasticizes the base metal of respective shaft portion 1 and bushing mount portion 2. FSW tool 5 is moved along the line of the junction which extends over the outer circumferences of the end portions of shaft portion 1 and bushing mount portion 2, while being kept rotated in contact with the outer circumferential surfaces along the junction line. The base metal of respective shaft portion 1 and bushing mount portion 2 are plasticized and stirred, so that the end portions of shaft portion 1 and bushing mount portion 2 are welded together to form the link. When the welding is completed, FSW tool 5 is retreated from weld joint portion W of the link. Weld joint portion W of the link is thus formed with hole 3 through which FSW tool 5 is removed from weld joint portion W.

SUMMARY OF THE INVENTION

Generally, a bending moment is applied to a suspension link of vehicles as well as large compressive and tensile forces are repeatedly exerted thereon. The bending moment acts on rubber bushing 4 mounted to bushing mount portion 2. Here, if rigidity, namely, resistance against deformation, of rubber bushing 4 is measured with respect to torsional force Rx acting about axis $O_1$ of rubber bushing 4 and torsional force Rz acting about axis $O_2$ that intersects axis $O_1$ and axis X of shaft portion 1, the rigidity of rubber bushing 4 against torsional force Rz is lower than that against torsional force Rx, and therefore rubber bushing 4 is readily deformable in the direction of torsional force Rz. The bending moment acts on rubber bushing 4 in the direction of axis $O_1$.

Assuming that bending moment is applied to the link with hole 3 which is located such that a center axis thereof is parallel to axis $O_1$ of rubber bushing 4, the maximum stress based on the bending moment will be caused at hole 3 so that hole 3 is deformed. This will lead to reduction of mechanical strength of the link. Accordingly, after the FSW is finished, it will be required to do additional work for filling hole 3 by a suitable method such as metal electrode inert gas (MIG) welding. This will lead to increase in the production cost of the link.

It is an object of the present invention to provide an aluminum-based metal link capable of increasing the strength and reducing the production cost.

According to one aspect of the present invention, there is provided an aluminum-based metal link comprising:
  a shaft portion extending along a first axis, said shaft portion having opposed axial end portions;
  at least one bushing mount portion having a second axis perpendicular to the first axis; and
  at least one weld joint portion in which one of the opposed axial end portions of the shaft portion and the bushing mount portion are welded together by friction stir welding (FSW), the weld joint portion extending along outer peripheries of the one of the opposed axial end portions of the shaft portion and the bushing mount portion and formed with a hole having a third axis angularly offset from the second axis about the first axis, the hole being formed upon termination of the FSW.

According to a further aspect of the present invention, there is provided a method for producing an aluminum-based metal link comprising a shaft portion that extends along a first axis and has opposed axial end portions, at least one bushing mount portion that has a second axis perpendicular to the first axis and comprises a small-diameter portion and a large-diameter portion having a same outer diameter as the shaft portion, and at least one weld joint portion in which the bushing mount portion is welded to one of the axial end portions of the shaft portion, the weld joint portion being formed with a hole having a third axis angularly offset from the second axis about the first axis, the method comprising:
  forming the shaft portion and the bushing mount portion from workpieces, respectively;
  press-fitting the small-diameter portion of the bushing mount portion into the one axial end portion of the shaft portion until an end face of the large-diameter portion of the bushing mount portion is abutted on an end face of the one axial end portion of the shaft portion to form a junction of the large-diameter portion of the bushing mount portion and the one axial end portion of the shaft portion;
  relatively rotating the shaft portion with the bushing mount portion and a friction stir welding (FSW) tool and, at the same time, rotating the FSW tool while keeping the FSW tool in contact with the junction, to thereby form the weld joint portion along the junction;

terminating the relative rotation of the FSW tool and the shaft portion with the bushing mount portion when the FSW tool reaches a terminal position in which the FSW tool is angularly offset from the second axis about the first axis; and removing the FSW tool from the weld joint portion at the terminal position to thereby form the hole in the weld joint portion and thus provide the link having the hole formed in the weld joint portion.

DETAILED DESCRIPTION OF THE INVENTION

Figure 1:
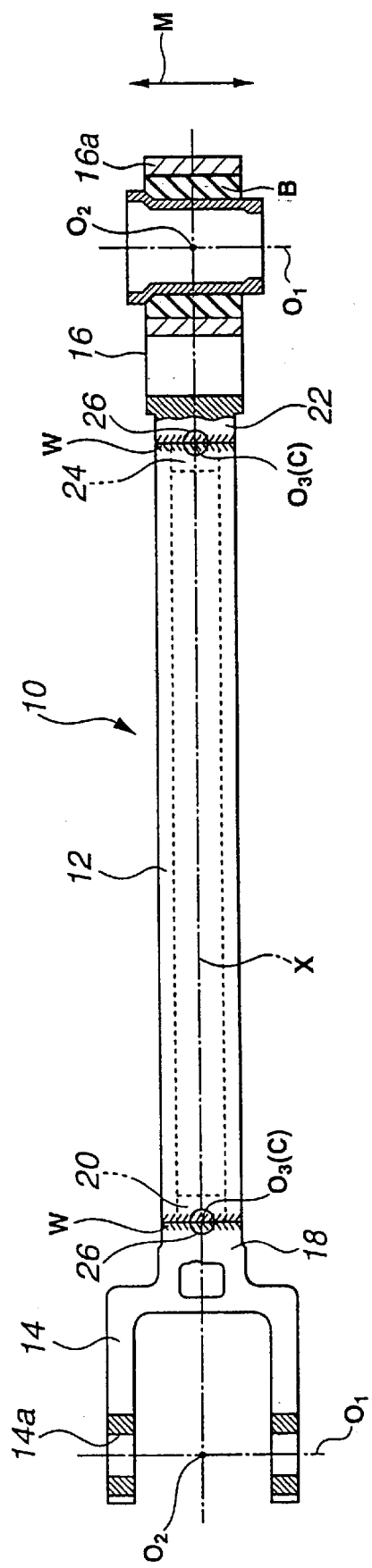
FIG. 1 is a diagram, partially in section, showing a link of a first embodiment, according to the present invention.
Figure 2:
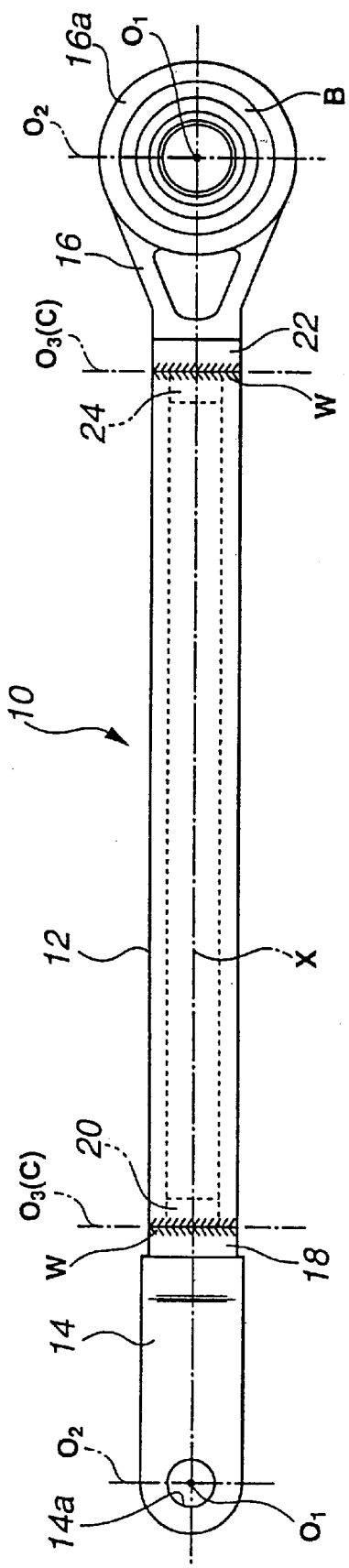
FIG. 2 is a plan view of the link shown in FIG. 1.

Referring now to FIGS. 1 and 2, an aluminum-based metal link of the first embodiment, according to the present invention, is explained. In this embodiment, the link is used as a suspension link of vehicles.

As illustrated in FIG. 1, link 10 includes shaft portion 12 extending along axis X and bushing mount portions 14 and 16 that are connected with opposed axial end portions of shaft portion 12 and have axes $O_1$, $O_1$ parallel to each other and perpendicular to axis X of shaft portion 12. Shaft portion 12 has a hollow cylindrical shape having a generally circular section and a predetermined length. Shaft portion 12 is formed by cutting a hollow-cylindrical bar-like workpiece made of aluminum alloy. Bushing mount portions 14 and 16 are produced by cutting an extrusion-molding workpiece made of aluminum alloy, into preforms having a predetermined width, and then machining the preforms. Bushing mount portions 14 and 16 and the opposed axial end portions of shaft portion 12 are welded together at weld joint portions W, W therebetween by friction stir welding (FSW) as explained later. Holes 26, 26 are formed in weld joint portions W, W. Holes 26, 26 have center axes C, C offset from the direction of axes $O_1$, $O_1$ of bushing mount portions 14 and 16 by a predetermined angle about axis X of shaft portion 12. In this embodiment, center axis C of each hole 26 is in substantially alignment with axis $O_3$ parallel to axis $O_2$ that is offset from the direction of axis $O_1$ of each bushing mount portion 14 and 16 by a right angle about axis X of shaft portion 12. Axis $O_2$ extends perpendicular to both of axis X of shaft portion 12 and axis $O_1$ of each bushing mount portion 14 and 16, as seen from FIGS. 1 and 2.

Specifically, bushing mount portion 14 includes large-diameter portion 18 having the same outer diameter as that of shaft portion 12, and small-diameter portion 20 formed on an axial end face of large-diameter portion 18 in coaxial relation thereto. Small-diameter portion 20 is press-fitted into one of the opposed axial end portions of shaft portion 12. Axis $O_1$ of bushing mount portion 14 extends through cylindrical mount hole 14a located opposite to small-diameter portion 20. Elastic bushing, not shown, made of electrometric material such as rubber, is mounted to mount hole 14a of bushing mount portion 14 so as to be coaxial with bushing mount portion 14, after the connection of bushing mount portion 14 with shaft portion 12.

Bushing mount portion 16 includes large-diameter portion 22 and small-diameter portion 24 which are the same structure as large-diameter portion 18 and small-diameter portion 20 of bushing mount portion 14. Small-diameter portion 24 is press-fitted into the other axial end portion of shaft portion 12. Axis $O_1$ of bushing mount portion 16 extends through a cylindrical mount hole of cylindrical support portion 16a located opposite to small-diameter portion 24. Elastic bushing B made of rubber is mounted to support portion 16a of bushing mount portion 16 and coaxial therewith. Prior to the connection of bushing mount portion 16 with shaft portion 12, elastic bushing B is attached to an inner peripheral surface of support portion 16a which surrounds the mount hole, by a suitable manner such as vulcanizing adhesion.

The connection of bushing mount portions 14 and 16 with the opposed axial end portions of shaft portion 12 is carried out as follows.

First, small-diameter portion 20 of bushing mount portion 14 is press-fitted into the axial end portion, the left end portion as viewed in FIGS. 1 and 2, of shaft portion 12 until an axial end face of large-diameter portion 18 of bushing mount portion 14 is abutted on the left end face of shaft portion 12 to form the junction of bushing mount portion 14 and shaft portion 12. At this butt joint state, the outer circumferential surface of large-diameter portion 18 of bushing mount portion 14 and the outer circumferential surface of shaft portion 12 are flush with each other. A boundary between large-diameter portion 18 of bushing mount portion 14 and the left end portion of shaft portion 12 forms the junction line extending over the entire outer circumferences thereof.

Figure 6:
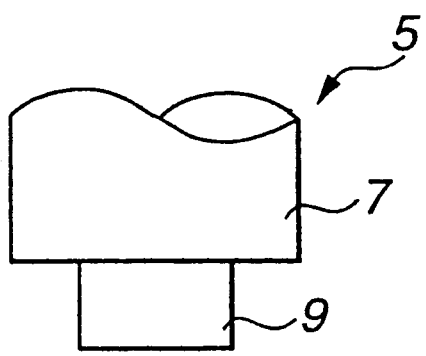
FIG. 6 illustrates a friction stir welding tool of a related art.

Subsequently, the FSW of shaft portion 12 and bushing mount portion 14 is conducted as follows. Shaft portion 12 with bushing mount portion 14 is rotated and, at the same time, a friction stir welding (FSW) tool is rotated while a rod portion thereof is kept in contact with the junction of large-diameter portion 18 of bushing mount portion 14 and the left end portion of shaft portion 12. FSW tool 5 as illustrated in FIG. 6 may be used as the FSW tool. The FSW tool is not limited to this type and other FSW tools having a rod portion brought into contact with the junction of shaft portion 12 and bushing mount portion 14 can be used. The FSW tool moves along the junction line, while keeping the rotation and the contact of the rod portion with the outer circumferential surfaces of large-diameter portion 18 of bushing mount portion 14 and the left end portion of shaft portion 12 which are disposed adjacent to the junction line. This produces friction heating that causes the base metals of the left end portion of shaft portion 12 and large-diameter portion 18 of bushing mount portion 14 to be plasticized, allowing the plasticized base metals to be stirred to form weld joint portion W in which large-diameter portion 18 of bushing mount portion 14 and the left end portion of shaft portion 12 are welded together. Thus, large-diameter portion 18 of bushing mount portion 14 and the left end portion of shaft portion 12 are connected with each other through weld joint portion W. The relative rotating movement of the FSW tool and shaft portion 12 having bushing mount portion 14 is not limited to this embodiment and it may be conducted in other suitable manners. The welding is terminated when the FSW tool reaches a terminal position in which the rod portion of the FSW tool is placed on axis $O_3$ parallel to axis $O_2$ that is perpendicular to both of axis X of shaft portion 12 and axis $O_1$ of bushing mount portion 14 as seen from FIGS. 1 and 2. Axis $O_3$ extends perpendicular to a direction of bending moment M to be applied to link 10 upon the occurrence of bending moment M. In the terminal position, the FSW tool is removed from weld joint portion W, so that hole 26 having center axis C substantially aligned with axis $O_3$ is formed in weld joint portion W.

Next, the connection of bushing mount portion 16 with the opposite axial end portion, namely, the right end portion as viewed in FIGS. 1 and 2, of shaft portion 12 is conducted in the following manner. Small-diameter portion 24 of bushing mount portion 16 is press-fitted into the right end portion of shaft portion 12 until an axial end face of large-diameter portion 22 of bushing mount portion 16 is abutted on the right end face of shaft portion 12 to form a junction of large-diameter portion 22 of bushing mount portion 16 and the right end portion of shaft portion 12. At this butt joint state, the outer circumferential surface of large-diameter portion 22 of bushing mount portion 16 is flush with the outer circumferential surface of the shaft portion 12. The junction line of large-diameter portion 22 of bushing mount portion 16 and the right end portion of shaft portion 12 extends at a boundary therebetween over the entire outer circumferences thereof.

The FSW of bushing mount portion 16 and shaft portion 12 is carried out using the FSW tool in the same manner as described in the FSW of bushing mount portion 14 and shaft portion 12. Shaft portion 12 with bushing mount portion 16 is rotated and, at the same time, the FSW tool is rotated while the rod portion thereof is kept in contact with the junction of large-diameter portion 22 of bushing mount portion 16 and the right end portion of shaft portion 12. The base metals of the right end portion of shaft portion 12 and large-diameter portion 22 of bushing mount portion 16 are plasticized and stirred to form weld joint portion W in which the right end portion of shaft portion 12 and large-diameter portion 22 of bushing mount portion 16 are welded together. The welding is terminated when the FSW tool reaches the terminal position in which the rod portion of the FSW tool is placed on axis $O_3$ parallel to axis $O_2$ perpendicular to both of axis X of shaft portion 12 and axis $O_1$ of bushing mount portion 16. Axis $O_3$ extends perpendicular to the direction of bending moment M to be applied to link 10 upon the occurrence of bending moment M. In the terminal position, the FSW tool is removed from weld joint portion W. As a result, hole 26 having center axis C substantially aligned with axis $O_3$ is formed in weld joint portion W between large-diameter portion 22 of bushing mount portion 16 and the right end portion of shaft portion 12.

As described above, each hole 26 is located in weld joint portion W such that center axis C thereof is offset from axis $O_1$ of bushing mount portion 14 and 16 by substantially the right angle about axis X of shaft portion 12. With the arrangement of holes 26 of respective weld joint portions W, W, weld joint portions W, W can be less influenced by bending moment M imparted thereto through the peripheral portions surrounding holes 26. This can serve for increasing strength of link 10 and omit an additional work for filling holes 26 by metal electrode inert gas (MIG) welding, serving for reducing the production cost of link 10.

Figure 3A:
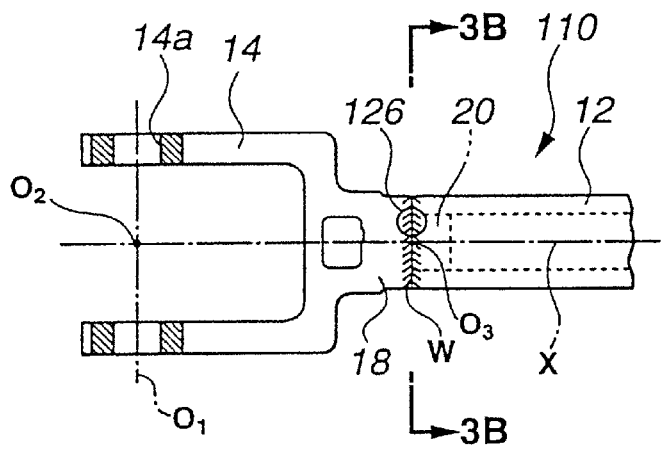
FIG. 3A is a diagram similar to a left part of FIG. 1, but showing a second embodiment.
Figure 3B:
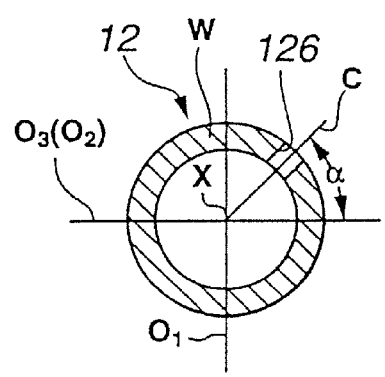
FIG. 3B is a section taken along line 3B—3B of FIG. 3A, showing a weld joint portion formed with a hole.

Referring to FIGS. 3A and 3B, link 110 of a second embodiment, according to the invention, will be explained hereinafter, which is similar to the first embodiment except that hole 126 is located in a position in which center axis C thereof is angularly offset from axis $O_3$ about axis X in one direction. Like reference numerals denote like parts and therefore detailed explanations therefor are omitted. Although FIGS. 3A and 3B illustrate merely hole 126 in weld joint portion W between the left end portion of shaft portion 12 and bushing mount portion 14, hole 126 is also formed in weld joint portion W between the right end portion of shaft portion 12 and bushing mount portion 16 in this embodiment.

As illustrated in FIG. 3A, hole 126 is offset upwardly from axis $O_3$. As illustrated in FIG. 3B, center axis C of hole 126 is offset from axis $O_3$ by predetermined angle α about axis X in a counter-clockwise direction. Predetermined angle α is 45 degrees at maximum in a plus angular region that is located at an upper-right quarter of the circular section of shaft portion 12 as viewed in FIG. 3B. For the purpose of simple illustration, FIG. 3B shows hole 126 radially extending through shaft portion 12. A depth of hole 126 is not specifically determined.

The FSW of shaft portion 12 and bushing mount portions 14 and 16 in this embodiment is carried out in the same manner as explained in the first embodiment except that, in the terminal position the rod portion of the FSW tool is placed offset from axis $O_3$ by predetermined angle α about axis X in the counter-clockwise direction as shown in FIG. 3B, and then the FSW tool is removed from weld joint portion W.

Figure 4A:
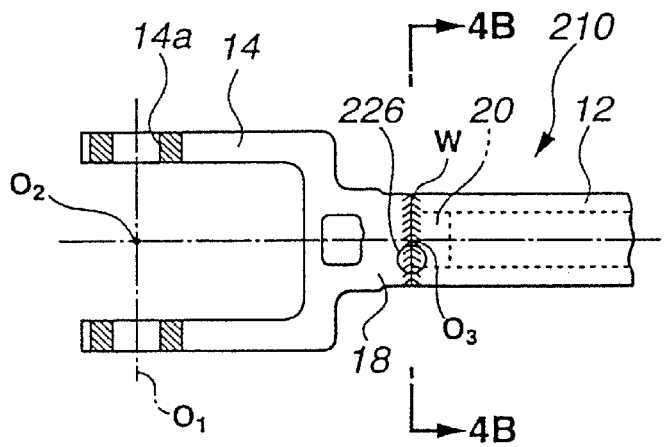
FIG. 4A is a diagram similar to a left part of FIG. 1, but showing a third embodiment.
Figure 4B:
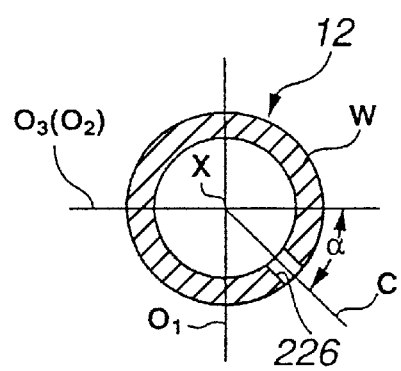
FIG. 4B is a section taken along line 4B—4B of FIG. 4A, showing a weld joint portion formed with a hole.
Figure 5:
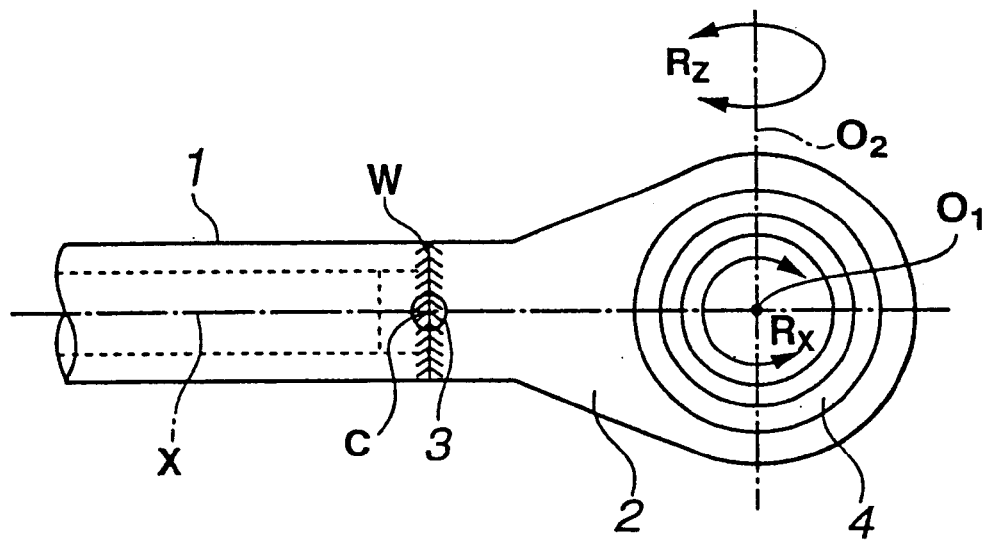
FIG. 5 illustrates a link of a related art.

Referring now to FIGS. 4A and 4B, link 210 of a third embodiment, according to the invention, is explained. The third embodiment is the same as the second embodiment except that hole 226 is located in a position in which center axis C thereof is angularly offset from axis $O_3$ about axis X in an opposite direction.

As illustrated in FIG. 4A, hole 226 is offset downwardly from axis $O_3$. As illustrated in FIG. 4B, center axis C of hole 226 is offset from axis $O_3$ by predetermined angle α about axis X in a clockwise direction. Predetermined angle α is 45 degrees at maximum in a minus angular region that is located at a lower-right quarter of the circular section of shaft portion 12 as viewed in FIG. 4B.

The FSW of shaft portion 12 and bushing mount portions 14 and 16 in this embodiment is carried out in the same manner as explained in the first embodiment except that, in the terminal position the rod portion of the FSW tool is placed offset from axis $O_3$ by predetermined angle α about axis X in the clockwise direction as shown in FIG. 4B, and then the FSW tool is removed from weld joint portion W.

As be appreciated from the above description, center axes C, C of holes 126 and 226 in the second and third embodiments are positioned within the angular range of +45 degrees to −45 degrees relative to axis $O_3$ parallel to axis $O_2$ perpendicular to axis $O_1$ and axis X. Thus, holes 126 and 226 are located in weld joint portion W such that center axes C, C thereof are angularly offset from axis $O_1$ of bushing mount portion 14 and 16 about axis X of shaft portion 12. With the arrangement, links 110 and 210 of the second and third embodiments can exhibit the effects of increase in strength and cost-saving as described in the first embodiment.

Shaft portion 12 is not limited to the hollow cylindrical shape having the generally circular section as described in the above embodiments. Shaft portion 12 may be of a solid cylindrical shape having a generally circular section or of a hollow or solid prismatic shape having a rectangular section.

Further, bushing mount portions 14 and 16 may be joined with shaft portion 12 such that axes $O_1$, $O_1$ thereof are located in different directions, for instance, perpendicular to each other.

This application is based on Japanese Patent Application No. 2000-112574, filed on Apr. 13, 2000, the entire contents of which, inclusive of the specification, claims and drawings, are hereby incorporated by reference herein.

Although the invention has been described above by reference to the certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An aluminum-based metal link comprising:
   a shaft portion extending along a first axis, said shaft portion having opposed axial end portions;
   at least one bushing mount portion having a second axis perpendicular to the first axis;
   at least one weld joint portion in which one of the opposed axial end portions of the shaft portion and the bushing mount portion are welded together by friction stir welding (FSW), the weld joint portion extending along outer peripheries of the one of the opposed axial end portions of the shaft portion and the bushing mount portion; and
   a hole having a third axis angularly offset from the second axis about the first axis and formed in the weld joint portion, the hole being formed upon termination of the FSW;
   wherein the shaft portion has a generally circular shape in section, the third axis of the hole being offset from a fifth axis parallel to a fourth axis perpendicular to the first and second axes by a predetermined angle about the first axis.

2. The link as claimed in claim 1, wherein the predetermined angle is within a range of +45 degrees to −45 degrees.

3. An aluminum-based metal link comprising;
   a shaft portion extending along a first axis, said shaft portion having opposed axial end portions;
   at least one bushing mount portion having a second axis perpendicular to the first axis;
   at least one weld joint portion in which one of the opposed axial end portions of the shaft portion and the bushing mount portion are welded together by friction stir welding (FSW), the weld joint portion extending along outer peripheries of the one of the opposed axial end portions of the shaft portion and the bushing mount portion; and
   a hole having a third axis angularly offset from the second axis about the first axis and formed in the weld joint portion, the hole being formed upon termination of the FSW;
   wherein the third axis of the hole is substantially parallel to a fourth axis perpendicular to the first and second axes.

4. The link as claimed in claim 3, wherein the third axis of the hole is substantially aligned with a fifth axis parallel to the fourth axis.

5. The link as claimed in claim 3, further comprising an elastic bushing mounted to the bushing mount portion, the elastic bushing being coaxial with the bushing mount portion.

6. An aluminum-based metal link comprising;
   a shaft portion extending along a first axis, said shaft portion having opposed axial end portions;
   at least one bushing mount portion having a second axis perpendicular to the first axis;
   at least one weld joint portion in which one of the opposed axial end portions of the shaft portion and the bushing mount portion are welded together by friction stir welding (FSW), the weld joint portion extending along outer peripheries of the one of the opposed axial end portions of the shaft portion and the bushing mount portion; and
   a hole having a third axis angularly offset from the second axis about the first axis and formed in the weld joint portion, the hole being formed upon termination of the FSW;
   wherein the bushing mount portion comprises a second bushing mount portion having an axis perpendicular to the first axis of the shaft portion, the weld joint portion comprising a second weld joint portion in which the other of the opposed axial end portions of the shaft portion and the second bushing mount portion are welded together by FSW, the second weld joint portion extending along outer peripheries of the other of the opposed axial end portions of the shaft portion and the second bushing mount portion and formed with a second hole having an axis angularly offset from the axis of the second bushing mount portion about the first axis of the shaft portion and formed in the second weld joint portion, the second hole being formed upon termination of the FSW.

7. A method for producing an aluminum-based metal link comprising a shaft portion that extends along a first axis and has opposed axial end portions, at least one bushing mount portion that has a second axis perpendicular to the first axis and comprises a small-diameter portion and a large-diameter portion having a same outer diameter as the shaft portion, at least one weld joint portion in which the bushing mount portion is welded to one of the axial end portions of the shaft portion, and a hole having a third axis angularly offset from the second axis about the first axis and formed in the weld joint portion, the method comprising:
   forming the shaft portion and the bushing mount portion from workpieces, respectively;
   press-fitting the small-diameter portion of the bushing mount portion into the one axial end portion of the shaft portion until an end face of the large-diameter portion of the bushing mount portion is abutted on an end face of the one axial end portion of the shaft portion to form a junction of the large-diameter portion of the bushing mount portion and the one axial end portion of the shaft portion;
   relatively rotating the shaft portion with the bushing mount portion and a friction stir welding (FSW) tool and, at the same time, rotating the FSW tool while keeping the FSW tool in contact with the junction, to thereby form the weld joint portion along the junction;
   terminating the relative rotation of the FSW tool and the shaft portion with the bushing mount portion when the FSW tool reaches a terminal position in which the FSW tool is angularly offset from the second axis about the first axis; and
   removing the FSW tool from the weld joint portion at the terminal position to thereby form the hole in the weld joint portion and thus provide the link having the hole formed in the weld joint portion;

wherein the terminal position comprises a terminal position in which the FSW tool is offset from a fifth axis parallel to a fourth axis perpendicular to the first and second axes by a predetermined angle about the first axis.

8. The method as claimed in claim 7, wherein the predetermined angle is within a range of +45 degrees to −45 degrees.

9. A method for producing an aluminum-based metal link comprising a shaft portion that extends along a first axis and has opposed axial end portions, at least one bushing mount portion that has a second axis perpendicular to the first axis and comprises a small-diameter portion and a large-diameter portion having a same outer diameter as the shaft portion, at least one weld joint portion in which the bushing mount portion is welded to one of the axial end portions of the shaft portion, and a hole having a third axis angularly offset from the second axis about the first axis and formed in the weld joint portion, the method comprising:

forming the shaft portion and the bushing mount portion from workpieces, respectively;

press-fitting the small-diameter portion of the bushing mount portion into the one axial end portion of the shaft portion until an end face of the large-diameter portion of the bushing mount portion is abutted on an end face of the one axial end portion of the shaft portion to form a junction of the large-diameter portion of the bushing mount portion and the one axial end portion of the shaft portion;

relatively rotating the shaft portion with the bushing mount portion and a friction stir welding (FSW) tool and, at the same time, rotating the FSW tool while keeping the FSW tool in contact with the junction, to thereby form the weld joint portion along the junction;

terminating the relative rotation of the FSW tool and the shaft portion with the bushing mount portion when the FSW tool reaches a terminal position in which the FSW tool is angularly offset from the second axis about the first axis; and removing the FSW tool from the weld joint portion at the terminal position to thereby form the hole in the weld joint portion and thus provide the link having the hole formed in the weld joint portion;

wherein the terminal position comprises a terminal position in which the FSW tool is placed substantially on a fifth axis parallel to a fourth axis perpendicular to the first and second axes.

10. An aluminum-based metal link comprising:

a shaft portion extending along a first axis, said shaft portion having opposed axial end portions;

at least one bushing mount portion having a bore and having at least one bushing positioned such that the axis of the bushing bore forms a second axis perpendicular to the first axis;

at least one weld joint portion in which one of the opposed axial end portions of the shaft portion and the bushing mount portion are welded together by friction stir welding (FSW), the weld joint portion extending along outer peripheries of the one of the opposed axial end portions of the shaft portion and the bushing mount portion; and a hole having a third axis angularly offset from the second axis about the first axis and formed in the weld joint portion, the hole being formed upon termination of the FSW;

wherein the hole is angularly offset from the second axis by an offset value such that the link is adapted to accept the substantially greatest nondestructive torsional force about the second axis applied to the link.

11. The link of claim 10, the hole is angularly offset from the second axis by an offset value such that the link is adapted to accept the substantially greatest nondestructive torsional force about an axis normal to both the first axis and the second axis applied to the link.

12. An aluminum-based metal link comprising:

a shaft portion extending along a first axis, said shaft portion having opposed axial end portions;

at least one bushing mount portion having a bore and having at least one bushing positioned such that the axis of the bushing bore forms a second axis perpendicular to the first axis;

at least one weld joint portion in which one of the opposed axial end portions of the shaft portion and the bushing mount portion are welded together by friction stir welding (FSW), the weld joint portion extending along outer peripheries of the one of the opposed axial end portions of the shaft portion and the bushing mount portion; and a hole having a third axis angularly offset from the second axis about the first axis and formed in the weld joint portion, the hole being formed upon termination of the FSW;

wherein the hole is angularly offset from the second axis by an offset value such that the link is adapted to accept the substantially greatest nondestructive torsional force about an axis normal to both the first axis and the second axis applied to the link.

* * * * *